United States Patent
Gong et al.

(10) Patent No.: US 7,076,801 B2
(45) Date of Patent: Jul. 11, 2006

(54) INTRUSION TOLERANT SERVER SYSTEM

(75) Inventors: Fengmin Gong, Durham, NC (US); Chandramouli Sargor, Sunnyvale, CA (US); Feiyi Wang, Raleigh, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 792 days.

(21) Appl. No.: 09/878,824

(22) Filed: Jun. 11, 2001

(65) Prior Publication Data

US 2002/0188870 A1 Dec. 12, 2002

(51) Int. Cl.
*G06F 15/16* (2006.01)

(52) U.S. Cl. .............................. 726/11; 726/12; 726/13

(58) Field of Classification Search ................ 713/201; 726/11, 12
See application file for complete search history.

(56) References Cited

U.S. PATENT DOCUMENTS 5,991,881 A * 11/1999 Conklin et al. ............. 713/201
6,219,786 B1 * 4/2001 Cunningham et al. ...... 713/152
6,279,113 B1 * 8/2001 Vaidya ........................ 713/201
6,321,337 B1 * 11/2001 Reshef et al. ............... 713/201
6,671,821 B1 * 12/2003 Castro et al. .................. 714/4

* cited by examiner

*Primary Examiner*—Ayaz Sheikh
*Assistant Examiner*—Pramila Parthasarathy
(74) *Attorney, Agent, or Firm*—Oblon, Spivak, McClelland, Maier & Neustadt, P.C.

(57) ABSTRACT

The invention relates to a reconfigurable scalable intrusion-tolerant network that is interposed between a service requesting client and a protected server to minimize the impact of intrusive events. The apparatus may include a proxy server for receiving the requests from a client and forwarding them to a protected server. Acceptance monitors receive the response from a protected server and apply one or more acceptance tests. A ballot monitor receives the result of the acceptance tests and determines a response to the client. The network may also include an intrusion sensor to detect threats to the network and a reconfigurer to alter the network forwarding scheme. Reconfiguration may include isolating network elements, creating parallel paths, implementing redundant operations, or assessing the validity of responses.

34 Claims, 4 Drawing Sheets

INTRUSION TOLERANT SERVER SYSTEM

FIELD OF THE INVENTION

The present invention relates to an intrusion tolerant server system that includes a network interposed between a client and a protected server. It minimizes the impact of intrusive events and permits continued operation in the face of intrusion attacks. More specifically, the invention relates to a method and apparatus for dynamically reconfiguring a network to anticipate or respond to unwanted intrusions by, for example, isolating elements of the network, or creating parallel paths, or implementing redundant operations, or assessing the validity of responses.

BACKGROUND OF THE INVENTION

The approach of building computing systems that can prevent general attacks or unwanted intrusions has not been very successful. Intrusion detection and response research has primarily concentrated on known and well-defined attacks. While intrusion detection systems have been deployed, they have been regularly circumvented for profit, espionage or sport, and there have been notable instances where this has occurred. In addition, because prior systems have relied upon known and well-defined attacks, they have shown little improvement in blocking new or novel attacks, such as the recent Melissa and I LoveYou viruses.

Intrusion attacks do not follow published protocols, are not well defined, and often take advantage of the element of surprise. Because of their successes, and the failure of intrusion detection technologies to provide the desired security or fault tolerance required by today's mission-critical applications, the development and deployment of a trusted computing base has been hampered. There are many reasons. Commercial products are mostly signature based and rely on pattern matching to identify specific attacks. Such systems tend to be inadequate in detecting new attacks or variances of known attacks. Intrusion detection research has largely focused on anomaly based detection approaches or specific attacks that have already been successful, and problems arise in defining anomalies or unknown attack methods and algorithms for identifying them.

Fault tolerance technologies have suffered because of their focus on accidental faults and malicious faults planted at the design or implementation stages. This focus allows some reasonable assumptions to be made regarding predictable fault behaviors, but may allow active intrusions when the behavior is under malicious control that attempts to skirt the assumptions. Alternatively, the attacks result in intrusions, which have not been considered or designed against in the traditional fault tolerance systems.

Existing fault tolerance work has mostly focused on well-defined hardware or software modules whose fault modes are relatively easy to define. Large distributed service infrastructures, such as those found in a database web server, may have more complex functions, but that may make it more susceptible to attack or more difficult to define fault modes.

Fault tolerance techniques have been developed for building better systems from scratch, but there is great value in protecting the existing commercial, off the shelf server systems. Built in tolerance may be a superior solution, but the current information infrastructure and existing web networks make it desirable to develop technologies for hardening existing infrastructures and building better new ones. Accordingly, it is an object of the present invention to provide a method and apparatus for an intrusion tolerance server system.

Another object of the present invention is to provide a method and apparatus for a dynamically reconfigurable intrusion-tolerant architecture to minimize the impact of any expected or actual intrusion.

It is a further object of the present invention to provide a method and apparatus for an intrusion intolerant server that is scalable so that it can be expanded to encompass networks of varying size.

It is a still further object of the present invention to provide a method and apparatus for an intrusion tolerant server system that is dynamically reconfigurable for creating intrusion tolerant systems out of existing commercial, off the shelf systems or for hardening existing systems.

It is a still further object of the present invention to provide a method and apparatus for applying fault tolerance approaches, including the acceptance test, redundancy and replication principles, on an information server.

It is a still further object of the present invention to provide a method and apparatus for providing reliable responses when one or more components of the network have been compromised or exhibit unpredictable behavior.

These and other objects and advantages of the present invention will become apparent to those of ordinary skill in the art from a consideration of the drawings and ensuing description.

BRIEF DESCRIPTION OF THE INVENTION

The present invention is a method and apparatus for a scalable intrusion-tolerant network architecture to minimize the impact of intrusive events. A proxy server receives network service requests from a client and forwards the requests to a protected server. An acceptance monitor receives a response to the client request from the protected server and applies one or more acceptance tests. A ballot monitor receives the acceptance monitor test results and determines a preferred response to the client request.

An alternate embodiment may include a method and apparatus incorporating an intrusion sensor responsive to anomalies in operation of the network for detecting threats to the network. An adaptive reconfigurer may allocate and initialize new components within the network in instances where an intrusion has compromised the network and may serve to prioritize services to provide additional levels of security assurance.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE PRESENT INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Those of ordinary skill in the art will realize that the following description of the present invention is illustrative only and is not intended to be in any way limiting. Other embodiments of the invention will be readily suggested to those skilled in the art from an examination of this disclosure and drawings.

The goal is to maintain service quality and integrity of the responses. Survivable computing systems often provide what is often known as "defense in depth" by using a collection of mechanisms so that the burden of defense is placed in no single mechanism. Redundancy alone is insufficient to provide survivability since multiple identical systems share identical vulnerabilities. Thus, diversity is preferred so that an attack that penetrates one mechanism does not penetrate all of the other defense mechanisms. Diversity also enhances the likelihood that different servers might be immune to different attacks. This makes it more difficult to compromise all systems with a single, or even multifaceted, attack strategy.

Diverse platforms with varying operating systems and hardware are available for information services. Commercial, off the shelf servers are available that may be variously configured or obtained from different manufacturers. Web-based e-commerce servers or central database servers are typical. For the purposes of this disclosure, a web-based information service accessible via the Internet would be a typical embodiment.

Figure 1:
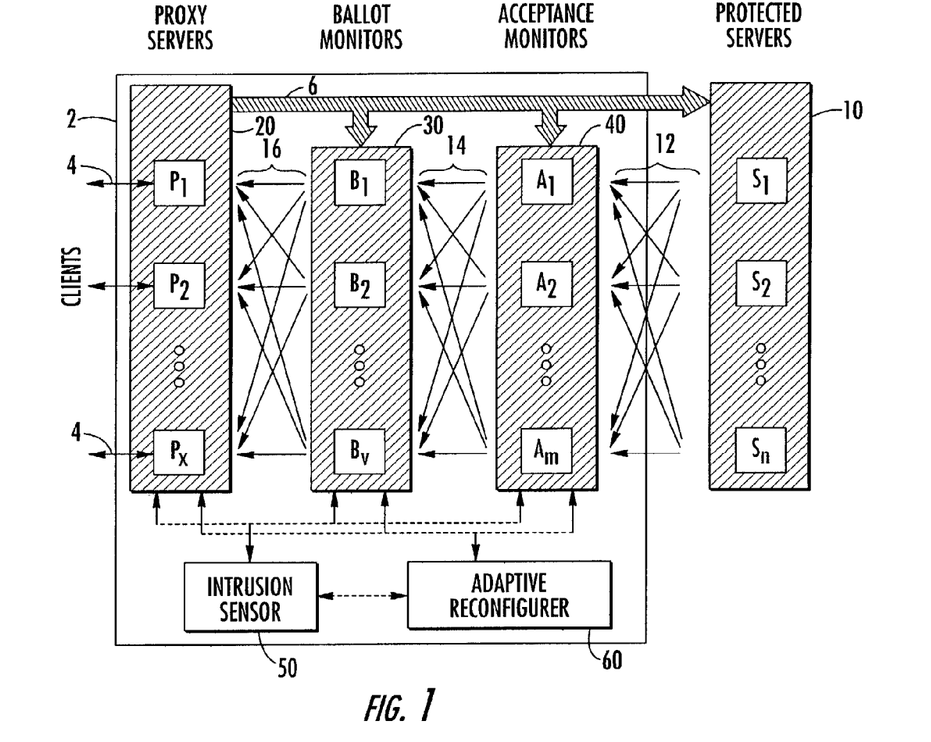
FIG. 1 is a schematic drawing of a scalable intrusion tolerant network architecture for receiving requests from clients and further illustrating security monitoring in accordance with the invention.

In an overview, referring to FIG. 1, a scalable intrusion-tolerant network architecture 2 is disposed between service requesting clients and protected servers 10. The intrusion-tolerant network receives incoming requests on any one of several communication lines 4. The requests are received by a group of proxy servers 20, which may include a multiplicity of individual proxy servers P1, P2, . . . PX. These individual proxy servers may or may not be linked in a network, as described later herein. Client requests received by the proxy servers 20 are forwarded over a network link 6 to the ballot monitors 30, acceptance monitors 40 and protected servers 10. The protected servers, not a part of the present invention, may be commercial, off the shelf servers linked together to provide responses to client requests. The requests may be forwarded to one or more servers S1, S2 . . . SN, and the responses may be provided through joint or isolated communication links.

The scalable intrusion-tolerant network architecture 2 and its component ballot and acceptance monitors and proxy servers are designed to require no or minimal changes to the protected servers 10. The intrusion-tolerant network architecture is preferably transparent to both the end users and the service applications, and achieves its objectives primarily by maintaining dynamic, reconfigurable links or network connections between the protected servers, acceptance and ballot monitors, and proxy servers.

Proxy Servers

The proxy servers 20 represent public access points to clients via communication lines 4 for the intrusion tolerant services being provided, such as a decision support system for military command and control or a transaction processing system for an e-commerce site. As the initial recipient of the requests, the proxy server may form the front line of the intrusion tolerant system and is most likely to be the target of external attacks. The attacks may range from simple denial of service attacks to attacks that may compromise one or more of the proxies P. All requests are supplied to at least one of the proxy servers P1, P2 . . . PX depending on the service needs. Typically, a client will not contact a protected server S directly, and many of the IP addresses of the protected servers are not publicly known. To the client it appears that the proxy server P is providing the response requested by the end user. The proxy server, in combination with the intrusion sensors 50 and adaptive reconfigurer 60, specifies the service policy based upon the current intrusion tolerance strategy. This includes which one or more of the protected servers S1, S2 . . . SN should receive the incoming request, how the responses from the protected servers should be tested, and how the results should be polled to arrive at a final response.

FIG. 1 illustrates a cluster of individual proxy servers P1, P2 . . . PX comprising the proxy server 20. While each server may have a distinct physical IP address tied to a distinct physical network interface, it will also share a pool of virtual IP addresses available among all of the individual servers or proxies P1, P2 . . . PX comprising the proxy server. This allows easy migration of addresses from one proxy to another in the event of a fault or intrusion. Depending upon the tolerance protocol, all of the virtual IP addresses advertised to the clients would be expected to be available. This is achieved by migrating virtual IP addresses from a faulty proxy (e.g., P1) to a properly functioning proxy (e.g., P2). This dynamic reconfiguration of the individual proxies enhances reliability because under normal circumstances a specific service may be provided on only one proxy, but when under attack the service could be migrated to all of the proxies to improve survivability and reliability. It is also desirable for each proxy to migrate its "state" or status to other proxies to maintain continuity. This also provides each of the individual proxies with a consistent view of the current tolerance protocol and their shared global state for the entire proxy server 20. Many techniques are available for sharing such state information, including multicast, shared memory, or Javaspaces.

The proxy servers 20 receive client requests and forward them to the protected servers 10 on network link 6 to fulfill the request. Depending upon the security protocol for the overall system, this request may be forwarded to more than one server of the protected servers. Decisions on which server(s) S1, S2 . . . SN receives the requests may be made on a per request basis, such as under high threat conditions, or on a session basis, such as under low threat conditions. The proxy server also coordinates the forwarding of the responses from the protected servers to one or more acceptance monitor A1, A2 . . . AN, correlates and coordinates responses from the acceptance monitors to one or more of the ballot monitors B1, B2 . . . BV, and receives the final result to be forwarded to the client.

Acceptance Monitors

Responses generated by the protected servers 10 are provided to the acceptance monitors 40 over reconfigurable network connections 12. One or more of the acceptance monitors A1, A2 . . . AM apply validity tests to the protected server responses. The results of the validity tests and the responses from the protected servers are forwarded via reconfigurable network connections 14 to the ballot monitors 30.

The acceptance tests check the reasonableness of the response provided from a server S. Such a test is a programmer or developer provided error detection measure in a software module. It may consist of a sequence of statements, which will raise an exception if the state of the system is not acceptable. If any exception is raised by the acceptance test, the server S may be considered to have failed or been compromised through a program on the server S or the server itself.

Acceptance tests may be devised as a test for what a server S should do or should not do, and different tests may be applied to provide overlapping or higher degrees of protection or independence. There is no single type of test that is considered most appropriate for all situations, making acceptance tests highly application dependent. Most acceptance tests may be classified into four categories, but they may not be directly applicable to any particular situation or requests. For example, a satisfaction of requirements test establishes conditions that must be met at the completion of a server execution. Accounting tests are suitable for transaction based applications involving simple mathematical operations, such as airline reservation systems, library records, or inventory control. They may tally the number of records or the number of transactions or evaluate double entry bookkeeping. Reasonableness tests detect software or system failures using pre-computed ranges or expected sequences of program states that are expected to be satisfied. They may be based on physical constraints or mathematical relationships that may define expected operating ranges or states. Computer run time tests may detect anomalous states such as divide by zero, overflow, underflow, undefined operations, end of file, or prohibited operation violations.

The acceptance monitors 40 are also designed to utilize intrusion sensors 50 to detect anomalies in the servers S. This can be achieved by using known intrusion detection methodologies like user profiling and application profiling. Historical system behavior may be used as a reference and any deviations or anomalies can be detected using suitable algorithms. For example, monitored parameters might include CPU activity, number of active users, response time of the application, disk space or memory storage. If either an acceptance test fails or the intrusion sensor 50 detects an anomaly, the proxy servers 20, ballot monitors 30 and acceptance monitors 40 may be alerted, the tolerance protocol may be revised, and the network connections 12, 14, 16 between protected servers/acceptance monitors, acceptance monitors/ballot monitors and/or ballot monitors/proxy servers may be altered to isolate components or network links, or to establish redundancy.

Ballot Monitors

The ballot monitors 30 receive the results of the applied acceptance tests and the responses from the acceptance monitors 40 via network connections 14 and determine a preferred response. The preferred response may be determined through any one of several technologies. The actual determining process used will depend on the current level of detected security threat and the designated intrusion tolerance strategy communicated by the adaptive reconfigurer 60. The preferred response determined by the ballot monitors is provided to the proxy servers via reconfigurable network connections 16. The proxy servers then forward the response to the requesting client via the communication lines 4.

The ballot monitors 30 determine a preferred response to the client request through a predetermined process such as a simple majority voting or adjudication process or a Byzantine agreement process for a given request. Single ballot voting is suitable in a relatively benign environment where optimum performance is the first priority. If notification is received that one or more of the balloters B has been potentially compromised, the network may be reconfigured to establish distributive voting to increase the tolerance capability. For example, a Fletcher checksum algorithm creates a single numeral value to compare and is easy to calculate; yet it can detect patterns of data corruption different from the standard Internet 1's-compliment checksum. Simple checksum schemes such as the Fletcher Checksum have the advantage of fast computation and the ability to detect certain patterns of data corruption. However, under a severe threat, a more robust checksum such as an MD5 or keyed MD5 may be employed to meet the increased security requirements. An MD5 checksum algorithm takes as input a message of arbitrary length and produces as output a 128-bit "finger print" or "message digest" of the input. It is believed to be computationally infeasible to produce two messages having the same message digest, or to produce any message having a given pre-specified target message digest. A keyed MD5 algorithm, a further refinement of the MD5 algorithm, generates a digital signature with a private key for a given data set, typically a large file. In the present invention, the server's response would be encrypted with the issuer's private key. This would provide an additional level of security if there is a risk that the forwarding of information from the acceptance monitor to the ballot monitor could be compromised.

Figure 2:
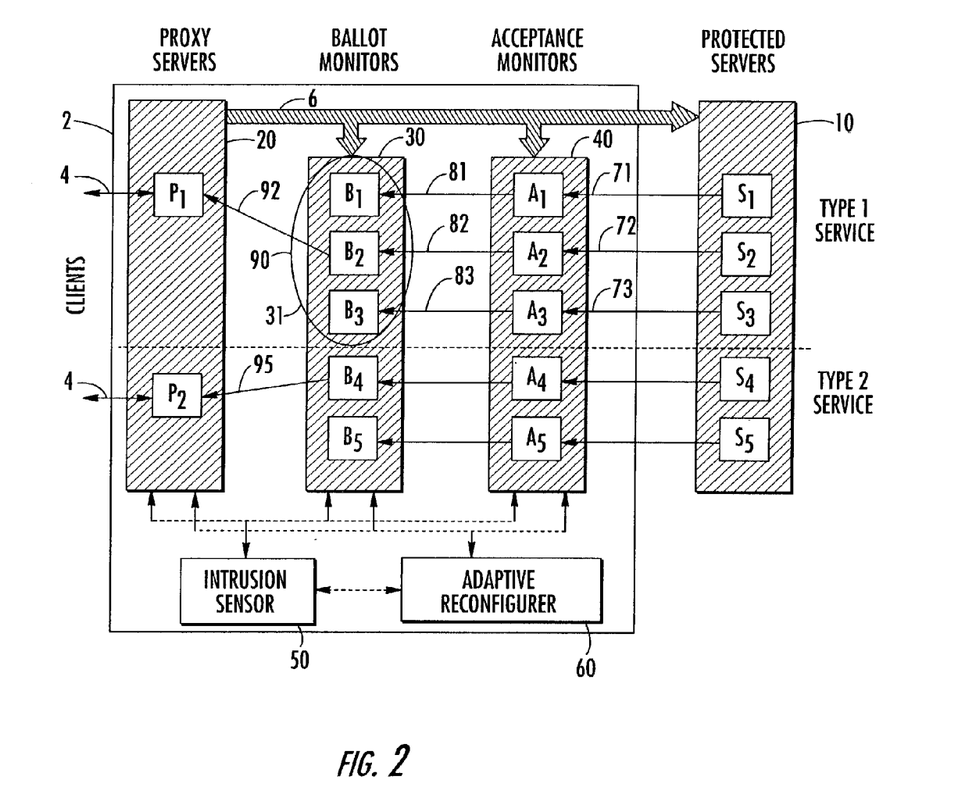
FIG. 2 is a schematic drawing of a scalable intrusion tolerant network architecture providing two levels of service to provide a higher level of correct response assurance when the underlying servers are under an actual or significant threat of intrusion, in accordance with the present invention.

The adjudication process adapts to different tolerance protocols, making it possible to alter the forwarding of the results from the acceptance monitors 40 to the ballot monitors 30 using network connections 14 to dynamically reconfigure the network between them. For example, each balloter B could be mapped to a single acceptor A or server S. Under such circumstances, it may be necessary to run an agreement algorithm on several of the balloters B1, B2 . . . BV to determine a final vote. Referring to FIG. 2, an agreement algorithm is represented by the ring 31 encircling balloters B1, B2 and B3. Alternatively, if each balloter B receives all of the responses from each acceptor A or server S, it can arrive at a final vote independently without the necessity of an agreement algorithm. Another alternative is to designate a trusted balloter B as the sole announcer entrusted with presenting all of the balloting results to the proxy P, as shown by network connection 92 from balloter B2 to proxy P1 or network connection 95 from balloter B4 to proxy P2. Another option is to have a dynamic announcing process so that different balloters B serve as announcers for different requests or at different times. A still further option is for each balloter B to present its own results to one or more proxies, which in turn will determine the final answer.

Intrusion Sensors

Intrusion sensors 50 detect signs of attack or compromise in the network 2 and its components, such as the proxy servers; ballot monitors, acceptance monitors, and related communication links. These sensors may be distributed among any one or more of the network components in real or virtual fashion, and may be hardware or software based, or any other type of suitable detector.

Commercially available intrusion detection systems may be utilized. Alternatively, intrusions may be modeled as anomalies in normal user patterns or requests, or misuse based on traffic and usage patterns. The intrusion sensors 50 may operate on a stand-alone basis or be physically present in or among each of the proxies P, balloters B, and acceptors A. The intrusion sensors at the proxies P may keep track of the source and frequency of requests as well as the usage of service types and abnormalities in the incoming requests. Normal patterns can be established and deviations detected to signal anomalies. Intrusion sensors that have firewall capabilities are particularly useful at the proxies P for functioning as a security filter.

The intrusion sensors at the acceptance monitors A may model system activity and research usage data like CPU utilization, amount of real or virtual memory, disk space and paging rates, and application response time to serve as potential indicators of attacks on the protected servers S. Such data could be collected periodically and dynamically, and intrusions can be detected based upon real time comparisons or analyses. The intrusion sensors deployed at the ballot monitors B may keep track of variations in any one or more of the transformations or applied tests. Intrusion sensors on the network connections may monitor network traffic.

Adaptive Reconfigurer

The adaptive reconfigurer 60 receives information from the intrusion sensors 50 and the acceptance monitors 40, ballot monitors 30 and proxy servers 20. Using that information it evaluates any intrusion threats, compares them to the tolerance objectives and any cost or performance impact, and generates new configurations for the system as necessary, and as illustrated by, for example, FIGS. 2 and 3. Such reconfigurations may include changing the level of access control imposed on clients, degrees of redundancy or isolation, increased sensitivity by the intrusion sensor, or altering the tolerance protocol, the acceptance tests, ballot monitoring programs, network connections, or other network characteristics. For example, when detecting an attack or compromised module, the adaptive reconfigurer will evaluate the level of the attack and determine whether a reconfiguration is necessary based upon the tolerance protocol. In addition, the adaptive reconfigurer 60 is capable of reconfiguring the network connections 12, 14, 16 among the proxy server 20, acceptance monitor 40 and ballot monitor 30 in response to a predetermined condition to support a desired security level. Such a condition may be triggered by the intrusion sensor 50 or set in advance if a hostile environment is anticipated.

Figure 3:
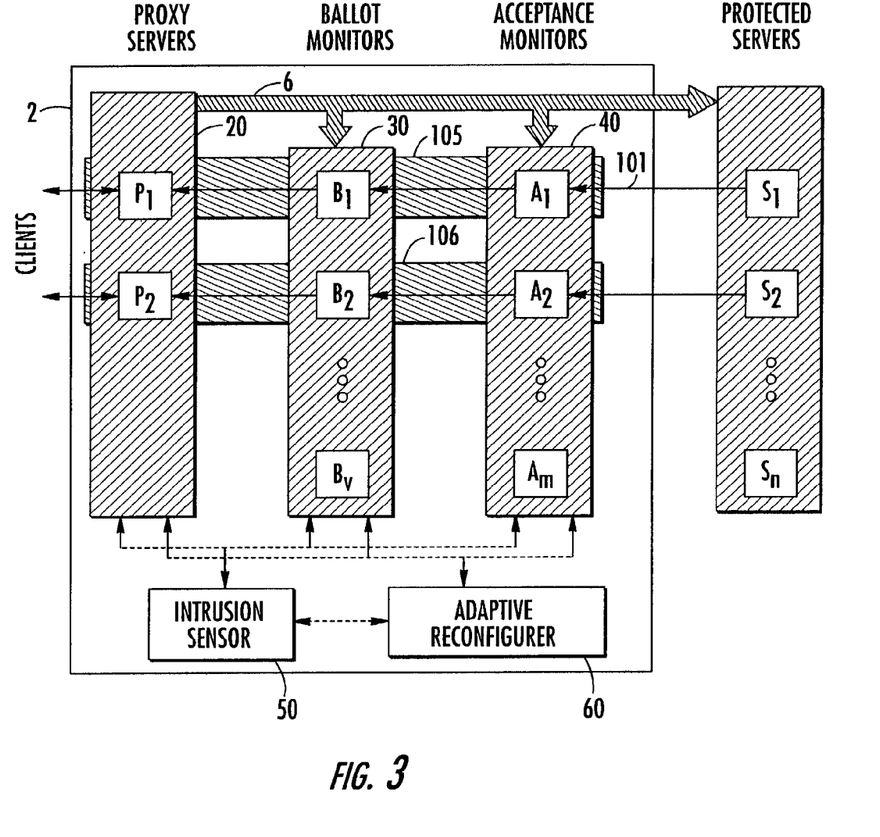
FIG. 3 is a schematic drawing of a scalable intrusion-tolerant network architecture operating under a low threat condition, in accordance with the present invention.

Variations in the network forwarding schemes are illustrated in FIGS. 2 and 3. For instance, FIG. 2 illustrates a high level of redundancy established through independent parallel forwarding to minimize errors resulting from compromised or failed components or to provide spares to restore operation after an attack or failure. Alternatively, functions and resources devoted to nonessential services can be reallocated to the delivery of essential services, making users unaware of a degradation. Dynamic reconfiguration of the intrusion-tolerant network is achieved through automatic operation and may be defined by the acceptance protocol to enforce different security policies based on input from an intrusion sensor or other source. The dynamically reconfigurable nature of the network also makes it scalable for distributive services in a variety of different network environments. Preferably, the adaptive reconfigurer also protects from degrading security functions as different protocols are implemented to prevent a two-phase attack that in the first phase causes the system to reconfigure and in the second phase exploits a vulnerability of the reconfigured system.

Reconfiguring the system to support different intrusion tolerant strategies may also include interfacing with the user at a proxy P to accept or reject a request. It may also include interpreting a service request or a service security specification and mapping it into one of the available intrusion tolerant strategies. It may also include determining the servers S that may be used to support the selected intrusion tolerant strategy, or the particular acceptors A or balloters B or proxies P assigned to a specific request, or making variations in the acceptance tests applied, ballot routines used, or ballot reporting sequences.

The adaptive reconfigurer 60 can consider multiple variables, such as the current states of the servers, balloters and acceptors, the current workload on the components, service security requirements, information technology policies, intrusion tolerant strategies, and resource availability. Fault models may be developed taking into account the types of faults, the handling procedure for each and the occurrence rate. Fault injection simulations may be based upon probability coverage and delay of detection, or probability coverage and delay of recognition. Analytical modeling may combine data from the fault model and fault injection simulations to determine mean time to system failure (reliability), mean downtime (availability) and degraded time (performability). The modeling may also involve the use of fault trees, Markov chains or stochastic Petri nets.

Referring to FIG. 2, a scalable intrusion-tolerant network architecture is illustrated with a high degree of intrusion tolerance, such as would be appropriate when the servers are under a significant threat. For example, if a large number of intrusions are detected by the intrusion sensor 50 via the detectors in the acceptance monitors 40 or proxy servers 20, it may be indicative that some of the servers S have been compromised or that there are active tasks underway. The adaptive reconfigurer 60 can then decide whether to escalate into a high tolerance protocol configuration, such as the Type 1 or Type 2 services illustrated.

As an example, for Type 1 service, a client request received at proxy servers 20 is forwarded over network link 6 and is simultaneously processed by three protected servers S1, S2, S3. Each server operates essentially independently from the other protected servers. The response from a server S1 is forwarded over independent link 71 to a dedicated and independently operating acceptor A1 for application of the designated acceptance test. Similarly, the responses from independently operating servers S2 and S3 are forwarded over independent links 72 and 73 to independently operating acceptors A2 and A3. The results of the applied acceptance tests from acceptor A1 are transferred over independent link 81 to dedicated balloter B1. Similarly, the responses from acceptors A2 and A3 are forwarded over independent links 82 and 83 to dedicated balloters B2 and B3.

A distributed voting process determines one final response using, for example, a predetermined agreement algorithm shown by oval 90, to collect, evaluate and select the single response from balloters B1, B2, B3 to be presented to proxy P1 over communication link 92 for return to the client over line 4. The operation of the ballot monitor agreement algorithm may be tailored as necessary or appropriate, including using the same techniques as utilized by the individual balloters. In this configuration, every dedicated process (P1, S1, S2, S3, A1, A2, A3, B1, B2, B3) may run on a separate and independent processor to minimize vulnerability of the service to either intrusion attacks or accidental system faults.

A similar configuration is used for the Type 2 service except that only two parallel servers S4, S5 are invoked for a given request and balloter B4 is the selected representative for presenting the final response to proxy P2 via network link 95.

Depending on the number of redundant components available and their current workload, the adaptive reconfiguration module 60 may have to reject nonessential services in favor of more essential ones to provide the independence and redundant necessary to minimize vulnerability.

Configurations with low degrees of intrusion tolerance are available if the services being provided are operating under a low-threat condition, as shown in FIG. 3. Under these conditions, the intrusion-tolerant network architecture may be configured so that each service request is assigned to only one protected server S. FIG. 3 shows two active requests being processed. The first request made through proxy P1 is forwarded over network link 6 to server S1. A second request arriving at proxy P2 is forwarded to protected server S2. Under this configuration the response from server SI is forwarded over link 101 to hosting processor 105 which hosts acceptor A1, balloter B1 and proxy P1. A second processor 106 hosts acceptor A2, balloter B2 and proxy P2. This configuration requires the smallest number of processors and provides the highest level of efficiency with capabilities of supporting the maximum number of parallel requests.

Operating in the low overhead configuration still requires vigilance by the intrusion sensor 50 and adaptive reconfigurer 60. Upon detection of an intrusion event, the adaptive reconfigurer alters the tolerance protocol and reconfigures the network forwarding scheme to distribute the functions of the acceptance monitors, ballot monitors and proxy servers to provide the requisite redundancy or isolation to minimize the impact of such a threat, including reconfiguration as shown in FIG. 2.

One consideration regarding strategies for intrusion tolerance is to determine, as best possible, the actual level of security threat. This threat level directly impacts the level of redundancy required to ensure dependable service and maintain desired efficiencies. The highest level of threat protection, as illustrated in FIG. 2, provides redundant servers, balloters and acceptors; each assigned to a given request in parallel. Different levels of service are available, as distinguished in Type 1 and Type 2 service in FIG. 2. At the other end of the spectrum, zero redundancy is appropriate if there is no threat. An intermediate strategy may designate redundant servers as primary, secondary, tertiary, backup, etc. The primary server S is invoked first to process a request and additional servers are invoked for a given request only when necessary. In the absence of intrusions or faults, backup servers may be released for other tasks.

Figure 4:
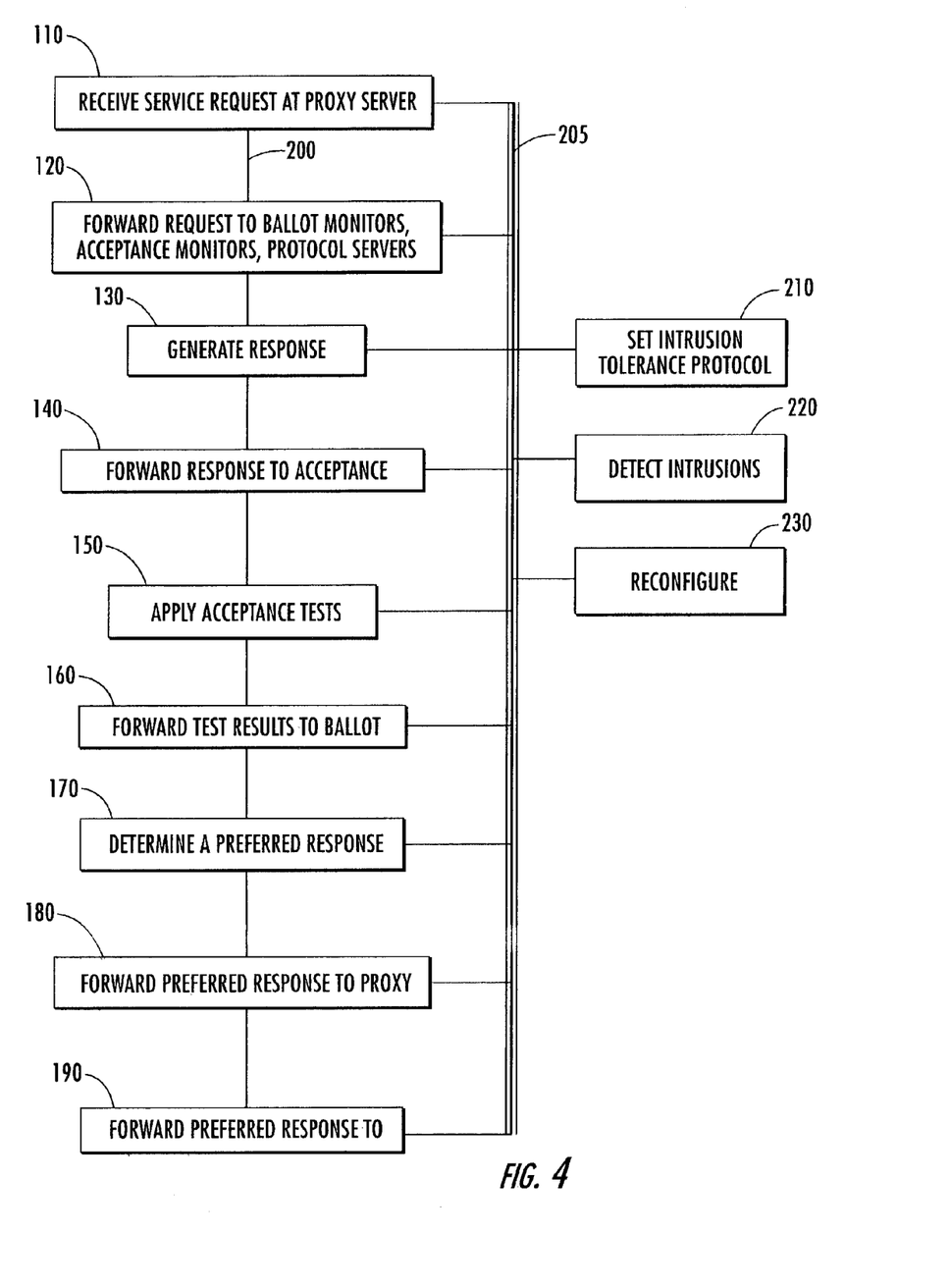
FIG. 4 is a flow diagram of a method for determining intrusions within a scalable intrusion tolerant network, in accordance with the present invention.

FIG. 4 is a flow diagram of a method for an intrusion tolerant server system of the present invention. Block 110 represents receiving a service request from a client at the proxy servers 20. Block 120 represents forwarding service requests to the ballot monitors, acceptance monitors and protected servers over network link 6. Block 130 represents generating a response to the client request at protected servers 10. Block 140 represents forwarding the response from the protected servers 10 to the acceptance monitors 40 via the network connections 12. Block 150 represents applying the acceptance tests at the acceptance monitors 40.

Block 160 represents forwarding the acceptance test results and the generated response to the ballot monitors 30 over network connections 14. Block 170 represents determining a preferred response using the balloting techniques at the ballot monitors 30. Block 180 represents forwarding the preferred response as determined by the ballot monitors to the proxy servers using the network connections 16. Block 190 represents routing the preferred response from the proxy servers to the client. In an alternate embodiment it is possible to omit the operations normally performed by the ballot monitors 30 and represented by Block 170 under low threat conditions, such as might also be illustrated in FIG. 3.

Block 210 represents setting the intrusion tolerance protocol to anticipate potential threats, or to alter the tolerance protocol as directed. Block 220 represents the detection of intrusions as might be monitored at the proxy servers, ballot monitors, acceptance monitors or network connections. Block 230 represents reconfiguration of the network to isolate individual processors, provide independent or parallel network connections, redundant operations, and other features as described earlier to maintain reliable operation. The direct links 200 represent operation under a predetermined threat tolerance protocol, with one step proceeding directly to another. The broad network connection represented by thick line 205 reflects that the network components and connections are also interconnected to receive information from each other as in a matrix, including the intrusion sensor and adaptive reconfigurer, to reconfigure the intrusion-tolerant network pursuant to a selected protocol. And, while blocks 110–190 represent a linear progression for the method of receiving a request and providing a response, these steps may occur in a different order, or some may be omitted, depending upon the tolerance protocol, such as omitting the operation of the ballot monitors under low threat conditions. Alternatively, some may be added, such as adding the step of establishing parallel forwarding or isolating each processor.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A dynamically reconfigurable intrusion-tolerant network interposed between a service-requesting client and plural protected servers to minimize the impact of an intrusive event on the protected servers, comprising:

a proxy server configured to receive an incoming network service request from the client and to forward said request pursuant to a tolerance protocol to the plural protected servers;

a network link for communication of the incoming network service requests from the proxy server to respective ones of the plural protected servers;

at least two acceptance monitors configured to receive from the protected servers respective responses and to apply respective acceptance tests thereto, the respective responses generated at the protected servers in response to the incoming network service request and providing redundancy for the intrusion tolerant network; and a ballot monitor configured to receive from the acceptance monitors respective results of the applied acceptance tests and to determine a preferred response based on the respective results of the acceptance monitors to forward to the proxy server for transmission to the service-requesting client.

2. A dynamically reconfigurable intrusion-tolerant network interposed between a service requesting client and plural protected servers to minimize the impact of an intrusive event on the protected servers, comprising:
- a proxy server configured to receive incoming network service requests from the client and to forward said requests pursuant to a tolerance protocol to the protected servers;
- a network link connecting the proxy server to the protected servers and configured to forward the incoming network service requests to the protected servers;
- at least two acceptance monitors configured to receive from the protected servers respective responses and to apply respective acceptance tests thereto, the respective responses generated at the protected servers in response to the incoming network service request and providing redundancy for the intrusion tolerant network; and
- a ballot monitor configured to receive from the acceptance monitors respective results of the applied acceptance tests and to determine a preferred response based on the respective results of the acceptance monitors to forward to the proxy server for transmission to the service-requesting client;
- an intrusion sensor responsive to anomalies in operation of the network and configured to detect threats to the network; and
- an adaptive reconfigurer configured to alter the tolerance protocol and to reconfigure a network forwarding scheme among the proxy servers, the acceptance monitors, and the ballot monitor in response to a predetermined condition.

3. A network according to claim 1, wherein said proxy server further is configured to forward said incoming network service request to at least one of the acceptance monitors and the ballot monitor.

4. A network according to claim 1, wherein said proxy server comprises multiple proxy servers.

5. A network according to claim 1, wherein said ballot monitor comprises multiple ballot monitors.

6. A network according to claim 2, wherein said intrusion sensor comprises a multiplicity of sensors configured to monitor predetermined operations of the network.

7. A network according to claim 2, wherein said adaptive reconfigurer is configured to reconfigure the network forwarding scheme to establish parallel forwarding among the protected servers, the acceptance monitors, and the ballot monitor.

8. A network according to claim 1, wherein said proxy server is configured to forward said incoming network service request to at least one of the protected servers, the acceptance monitors, and the ballot monitor.

9. A network according to claim 1, wherein said acceptance monitor is configured to apply one or more acceptance tests taken from the group of satisfaction of requirements test, accounting test, reasonableness test, or computer run time test.

10. A network according to claim 1, wherein said ballot monitor is configured to determine the preferred response using a process taken from the group of simple majority voting, Byzantine agreement process, or adjudication process.

11. A network according to claim 2, wherein at least one of the proxy servers, the acceptance monitors, the ballot monitor, the intrusion sensor, and the adaptive reconfigurer comprises a separate processor.

12. A network according to claim 2, wherein two or more of the proxy servers, the acceptance monitors, the ballot monitor, the intrusion sensor, and the adaptive reconfigurer are configured to operate on a single processor.

13. A network according to claim 2, wherein the adaptive reconfigurer is configured to reconfigure the network forwarding scheme to establish multiple network forwarding paths.

14. A method for reconfiguring communication among network components to minimize the impact of an intrusive event on plural protected servers, comprising:
- receiving an incoming network service requests from a service requesting client and forwarding the request pursuant to a tolerance protocol to the plural protected servers;
- generating respective responses to the incoming network service request and forwarding the respective responses, the respective responses generated in response to the incoming network service request in order to provide redundancy;
- applying at least two acceptance monitors respective acceptance tests to the respective responses and forwarding respective acceptance test results;
- analyzing the acceptance test results, by a ballot monitor, to determine a preferred response based on the respective acceptance test results; and
- forwarding the preferred response to the service requesting client.

15. A method for dynamically reconfiguring communication among network components pursuant to multiple tolerance protocol to minimize the impact of an intrusive event on plural protected servers, comprising:
- receiving an incoming network service requests from a service requesting client and forwarding the request pursuant to a tolerance protocol to respective ones of plural protected servers;
- generating respective responses to the incoming network service request and forwarding the respective responses, the respective responses generated in response to the incoming network service request in order to provide redundancy;
- applying at least two acceptance monitors respective acceptance tests to the respective responses and forwarding respective acceptance test results;
- analyzing the acceptance test results, by a ballot monitor, to determine a preferred response based on the respective acceptance test results forwarding the preferred response to the service requesting client;
- detecting any anomalies in operation of the network; and
- revising the tolerance protocol and a network forwarding scheme in response to an anomaly in operation of the network,
- wherein the revising the tolerance protocol and network forwarding scheme further comprises determining the ballot monitor that will be used to support a selected tolerance protocol.

16. A method according to claim 14, wherein the receiving the incoming network service request further comprises:
- receiving the incoming network service request at a proxy server.

17. A method according to claim 14, wherein the receiving the incoming network service request further comprises:

forwarding the incoming network service request on multiple paths.

18. A method according to claim 14, wherein the generating the respective responses comprises:
generating the respective responses at any of the protected servers.

19. A method according to claim 14, wherein the forwarding the respective responses comprises:
forwarding the respective responses on multiple paths.

20. A method according to claim 14, wherein the forwarding the respective acceptance test results comprises:
forwarding the respective acceptance test results from the acceptance monitors to a ballot monitor.

21. A method according to claim 14, wherein the forwarding the respective acceptance test results comprises:
forwarding the respective acceptance tests results from the acceptance monitors to multiple ballot monitors.

22. A method according to claim 14, wherein the forwarding the respective acceptance test results comprises:
forwarding the respective acceptance tests results from the acceptance monitors on multiple paths.

23. A method according to claim 14, wherein the analyzing the acceptance test results comprises:
polling the respective acceptance test results at a ballot monitor.

24. A method according to claim 14, wherein the analyzing the acceptance test results comprises:
applying multiple polling routines.

25. A method according to claim 14, wherein the analyzing the acceptance test results comprises:
applying multiple polling routines to responses from each of a multiplicity of ballot monitors.

26. A method according to claim 14, wherein at least one of receiving an incoming network service request, generating the respective responses, applying respective acceptance tests, analyzing the acceptance test results, and forwarding the preferred response comprises:
utilizing a separate processor to enhance independence of operation and minimize the impact of the intrusive event.

27. A method according to claim 15, wherein the revising the tolerance protocol and network forwarding scheme further comprises:
forwarding the respective responses on multiple paths.

28. A method according to claim 15, wherein the revising the tolerance protocol and network forwarding scheme comprises:
forwarding the respective responses to multiple of the acceptance monitors.

29. A method according to claim 15, wherein the revising the tolerance protocol and network forwarding scheme comprises:
forwarding the applied acceptance test results to multiple ballot monitors.

30. A method according to claim 15, wherein the revising the tolerance protocol and network forwarding scheme comprises:
forwarding the preferred response to multiple proxy servers.

31. A method according to claim 15, wherein the revising the tolerance protocol and network forwarding scheme further comprises:
comparing any detected anomalies with known anomalies to identify a predetermined intrusion tolerance protocol.

32. A method according to claim 15, wherein the revising the tolerance protocol and network forwarding scheme comprises:
determining which of the acceptance monitors will be used to support a selected tolerance protocol.

33. A method according to claim 15, wherein the revising the tolerance protocol and network forwarding scheme comprises:
determining a proxy server that will be used to implement a selected tolerance protocol.

34. A method according to claim 15, wherein the revising the tolerance protocol and network forwarding scheme comprises:
prioritizing multiple incoming network service requests.

* * * * *

UNITED STATES PATENT AND TRADEMARK OFFICE
CERTIFICATE OF CORRECTION

| | | |
|---|---|---|
| PATENT NO. | : 7,076,801 B2 | Page 1 of 1 |
| APPLICATION NO. | : 09/878824 | |
| DATED | : July 11, 2006 | |
| INVENTOR(S) | : Fengmin Gong et al. | |

It is certified that error appears in the above-identified patent and that said Letters Patent is hereby corrected as shown below:

Column 12, line 16, change "requests" to --request--.

Signed and Sealed this

Tenth Day of July, 2007

JON W. DUDAS
*Director of the United States Patent and Trademark Office*